United States Patent [19]

May

[11] 3,739,259
[45] June 12, 1973

[54] POLE SYNCHRONIZATION TEST APPARATUS FOR MULTI-POLE CIRCUIT BREAKERS

[75] Inventor: William E. May, Croydon, Pa.

[73] Assignee: I-T-E Imperial Corporation, Philadelphia, Pa.

[22] Filed: Oct. 22, 1971

[21] Appl. No.: 191,937

[52] U.S. Cl. ............................................. 324/28 CB
[51] Int. Cl. ............................................. G01n 31/00
[58] Field of Search ................................ 324/28, 181

[56] References Cited
UNITED STATES PATENTS
3,393,360  7/1968  Keating ............................ 324/28 R Primary Examiner—Alfred E. Smith
Attorney—Ostrolenk, Faber, Gerb & Soffen

[57] ABSTRACT

A test circuit provides a thyristor for each pole of a multi-pole circuit breaker in series with a lamp. A transistor circuit starts a timing circuit in operation when the first pole contacts touch, and the thyristor associated with this first pole becomes conductive and its lamp is energized. The remaining poles must touch within a time interval determined by the timing circuit for their respective thyristor to become conductive, and for their respective indicating lamps to be energized.

11 Claims, 1 Drawing Figure

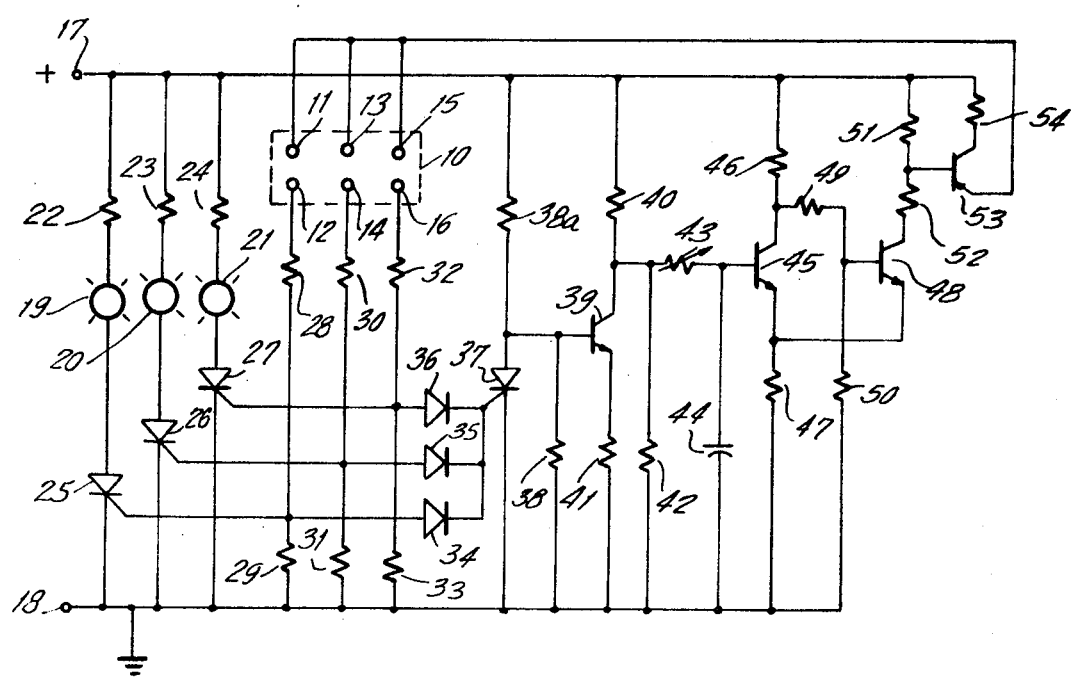

POLE SYNCHRONIZATION TEST APPARATUS FOR MULTI-POLE CIRCUIT BREAKERS

BACKGROUND OF THE INVENTION

This invention relates to a solid state circuit for measuring the occurrence of a plurality of events within a given time, and, in particular, relates to a novel all-electronic and portable test device for testing the closing synchronism of the plural poles of a multi-pole circuit breaker.

It is necessary that the individual poles of a multipole circuit breaker be adjusted to close as nearly simultaneously as possible. In practice, the manufacturer of the circuit breaker will determine the maximum time difference which should exist for a given breaker type in a given application.

The most common test in present use employs a multi-channel oscilloscope, with each channel connected to a respective pole of the breaker under test. A test voltage is then connected across each pole, with this test voltage changing when the pole contacts close. A comparison of the closing signals then gives information as to the time period within which all poles were closed.

the above method is time-consuming and requires expensive equipment and skilled technicians to perform the test. Moreover, considerable set-up time is needed, and some skill is necessary to properly interpret the test results.

Another method which has been employed with air magnetic and gas circuit interrupters employs the "feel" of the impact of the contacts as they close. Thus, a highly experienced technician can tell, with some accuracy, whether the contacts have closed within a given time. This test is obviously subject to human error, and, moreover, cannot be applied to devices using vacuum interrupters.

BRIEF SUMMARY OF THE INVENTION

In accordance with the present invention, a novel circuit is provided which can be easily built into a portable test unit and which uses a highly reliable circuit configuration with relatively few components. The electronic circuit of the invention contains an input terminal unit which provides terminal connections for receiving connections across each pole of a multi-pole circuit breaker, and an internal power supply, which may consist of a battery or a conventional power supply driven from an a-c power outlet. The test unit further provides an indicating lamp for each pole of the breaker being tested, and an adjustment means, such as a knob for adjusting the permissible time delay within which the contacts of all poles must close. The lamp associated with the first pole to close, and the lamp or lamps of the succeeding poles which close within the given time delay are energized. Thus, the tester knows, by observing which lamp or lamps are not lit, which pole or poles did not close within the given time delay, and require adjustment. The interconnection between the lamps, pole terminal inputs and timing circuit are accomplished by solid state circuit component devices which include a thyristor for each lamp, a timing thyristor which is fired by the first pole to close, and a transistor coupling circuit for coupling firing signals from any pole to its respective thyristor, only during a given time interval following the firing of the timing thyristor.

DESCRIPTION OF THE DRAWING

The attached drawing shows a circuit diagram of a preferred embodiment of the invention for use with two or three pole devices. It will be understood later that the device could be expanded more generally to monitor the occasion of any number of events which are to occur within a given time.

The circuit of the drawing will be mounted on a small, light-weight aluminum chassis, and is totally electronic and easily portable. Thus, the unit may be a convenient standard test unit which could be used in production facilities and supplied to the user for use during maintenance procedures.

The test unit contains a terminal block 10 which contains terminals 11 to 16, where terminal pairs 11-12, 13-14 and 15-16 are connected to the cooperating contacts of three respective poles of a three pole unit. Note that a two pole unit can also be tested, using only two pairs of terminals. Moreover, an added number of poles, or more generally, of events to be measured, could be tested by increasing the number of pairs of terminals on block 10. The test unit also provides a power supply, which could be from a battery, to provide, for example, 22.5 volts between positive terminal 17 and ground terminal 18.

Three indicating lamps 19, 20 and 21 are then connected in series with current limiting resistors 22, 23 and 24 respectively, and thyristors 25, 26 and 27 respectively, with each of these circuits connected between terminals 17 and 18. Thus, when any of thyristors 25, 26 and 27 are fired, their respective lamp 19, 20 or 21 is energized to indicate this fact. As will be seen, thyristors 25, 26 and 27 fire in response to the closing of the poles connected to terminals 11-12, 13-14 and 15-16 respectively, if their respective pole is either the first to close, or closes within some given time delay following the closing of the first pole to close.

Each of terminal pairs 11-12, 13-14 and 15-16 is connected in series with resistor pairs 28-29, 30-31 and 32-33 respectively. Resistors 29, 31 and 33 are then connected to terminal 18. The junction between resistors 28-29, 30-31 and 32-33 are connected to the gate terminals of thyristors 25, 26 and 27 respectively, and to the diodes 34, 35 and 36 respectively. Diodes 34, 35 and 36 form a three input "or" circuit to the gate of timing thyristor 37. The main terminals of thyristor 37 are connected in series with resistor 38a and in parallel with resistor 38.

A first transistor 39 is then provided as shown with its collector-emitter circuit connected in series with resistors 40 and 41 which are connected to terminals 17 and 18 respectively. A timing circuit including resistor 42, adjustable resistor 43 and capacitor 44 is then connected as shown between the collector of transistor 39 to the base of transistor 45. The collector-emitter circuit of transistor 45 is connected to terminals 17 and 18 respectively through resistors 46 and 47 respectively. The collector of transistor 45 is connected to the base of transistor 48 through resistor 49, and to terminal 18 through resistor 50. Resistors 51 and 52 are connected to terminal 17 and to the collector of transistor 48 and the emitter of transistor 48 is connected to resistor 47. The junction between resistors 51 and 52 is connected to the base of a fourth transistor 53. The collector of transistor 53 is connected to terminal 17 through resistor 54 while its emitter is connected to all of terminals 11, 13 and 15.

The operation of the circuit is as follows:

When the circuit is energized at terminals 17 and 18, and prior to the closing of the poles or other circuits connected to terminal pairs 11–12, 13–14 and 15–16, all of thyristors 25, 26, 27 and 37 are non-conductive.

Transistor 39 is biased "on" by the base voltage appearing at the junction between resistors 38a and 38 when the thyristor 37 is non-conductive.

Transistor 45 is biased "off" since its base is clamped to its emitter by the conducting transistor 39. Moreover, capacitor 44 is held discharged through conducting transistor 39.

Transistor 48 is biased "on" by the potential appearing on its base from the junction between resistors 49 and 50, so long as transistor 45 is non-conductive.

Transistor 53 is biased "on" by the potential appearing on its base from the junction between resistors 51 and 52, so long as transistor 48 is conductive.

Assume now that the circuit breaker under test is closed, and the contacts of the first pole to close actually touch. Note that it is unimportant which pole closes first. Assume, however, that the contacts of the pole connected to terminals 11 and 12 are the first to close. A circuit is thus formed from terminal 17, transistor 53 (which is in conduction), resistor 54, terminals 11 and 12, resistor 28, resistor 29 and terminal 18. A firing voltage is therefore applied to the gate of thyristor 25 and, through diode 34, to the gate of timing thyristor 37. The firing of thyristor 25 allows bulb 19 to light, indicating the closing of the pole associated with terminals 11 and 12. The firing of thyristor 37 causes the beginning of a timing sequence within which the remaining poles must close in order to fire their respective thyristors 26 and 27 and to ignite lamps 20 and 21. Note that if the poles associated with terminals 13–14 or 15–16 had closed first, their respective thyristor 26 or 27 would be the first to fire, and that timing thyristor 37 would also fire.

The firing of timing thyristor 37 removes biasing voltage from the base of transistor 39 so that transistor 39 switches from its normally "on" condition to an "off" condition. With transistor 39 switched off, capacitor 44 begins to charge at a rate determined by the values of resistor 40 and adjustable resistor 43 so that, after a given time delay, the voltage at the base of transistor 45 becomes high enough to cause its turning "on".

During this time delay interval, following the closing of the first pole to close, the closing of the subsequent poles connected to terminals 13–14 and 15–16 will permit the application of a firing signal from terminal 17, through the conducting transistor 53, through the closed poles at terminals 13–14 and 15–16, to the gates of thyristors 26 and 27. Thus, if one or both of the poles at terminals 13–14 or 15–16 close during the designated time interval, their associated lamp 20 or 21 is energized. However, it is not possible to energize these lamps if an associated pole closes later than after the end of this time interval.

At the end of the time delay, transistor 45 is turned on and transistors 48 and 53 are turned off. Thus, resistor 47 is a common emitter resistor for transistors 45 and 48. A voltage normally appears across resistor 47 due to the conduction of transistor 48. However, as the voltage across the timing capacitor 44 at the base of transistor 45 becomes greater than the emitter voltage of transistor 45, transistor 45 begins to conduct and rapidly forms a low impedance path across resistors 49 and 50 to turn "off" the transistor 48. Turning off the transistor 48 removes the base bias from normally conducting transistor 53 to turn off transistor 53.

With transistor 53 turned off, it is clear that the subsequent closing of poles attached to terminals 13–14 or 15–16 cannot provide the needed biasing current to fire thyristors 26 or 27. Thus, after a test is completed, the tester knows, by observing which of bulbs 19, 20 and 21 are turned on, which poles closed within a time set by adjustable resistor 43.

In order to prepare the circuit for a new operation, suitable reset switch means (not shown) may be provided to momentarily interrupt the power at terminals 17 and 18, or momentarily to open the circuits of thyristors 25, 26, 27 and 37.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. An electrical test circuit for testing the occurrence of a plurality of events within a given time; said test circuit comprising:
    a plurality of input circuits for connection to respective signal generating devices;
    a plurality of first switching devices corresponding to respective ones of said signal generating devices;
    a plurality of indicator devices connected to respective first switching devices of said plurality of first switching devices, and each being operable to an indicating condition responsive to a switching operation of their said respective switching device;
    a second switching means operable between first and second conductive conditions; said second switching means connected between each of said plurality of input circuits and each of said plurality of indicator devices whereby, only when said second switching means is in its said first conductive condition, the operation of any of said respective signal generating devices will operate its respective first switching device;
    a third switching device connected to each of said plurality of first switching devices and operable between first and second conductive conditions responsive to the operation of any of said signal generating devices;
    a timing circit connected to said third switching device and operable to a timing mode of operation responsive to the operation of said third switching device to said second conductive condition; said timing circuit connected to said second switching means and switching said second switching means to its said second conductive condition at the end of a given timing interval.

2. The test circuit of claim 1 which further includes adjustment means connected to said timing circuit for adjusting the length of said given timing interval.

3. The test circuit of claim 1 wherein said signal generating devices comprise the individual poles of a multiple-pole circuit breaker.

4. The test circuit of claim 1 wherein said plurality of said first switching devices and said third switching device are thyristors.

5. The test circuit of claim 1 wherein said plurality of indicator devices consist of lamps.

6. The test circit of claim 1 wherein said second switching means includes a transistor means normally biased to a conductive condition, and wherein said plurality of said first switching devices and said third switching devices are thyristors; the conduction of said thyristor defining said third switching device initiating the operation of said timing circuit; said timing circuit cutting off the conduction of said transistor means after said given timing interval.

7. The test circuit of claim 6 wherein said signal generating devices comprise the individual poles of a multiple-pole circuit breaker.

8. The test circuit of claim 7 which further includes adjustment means connected to said timing circuit for adjusting the length of said given timing interval.

9. The test circuit of claim 8 wherein said plurality of indicator devices consist of lamps.

10. The test circuit of claim 1 wherein said plurality of said switching devices together comprise a plural input "or" circuit to said third switching device.

11. The test circuit of claim 10, wherein said third switching device is a thyristor.

* * * * *